US008237996B2

(12) United States Patent
Takeuchi

(10) Patent No.: US 8,237,996 B2
(45) Date of Patent: Aug. 7, 2012

(54) IMAGE READING APPARATUS, CONTROLLER, IMAGE FORMING APPARATUS AND ANGULAR POSITION CONTROLLING METHOD

(75) Inventor: Hideo Takeuchi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 691 days.

(21) Appl. No.: 12/410,936

(22) Filed: Mar. 25, 2009

(65) Prior Publication Data
US 2009/0316223 A1 Dec. 24, 2009

(30) Foreign Application Priority Data

Jun. 24, 2008 (JP) ................................ 2008-164801

(51) Int. Cl.
H04N 1/04 (2006.01)
(52) U.S. Cl. ......... 358/474; 358/475; 358/482; 358/483
(58) Field of Classification Search .................. 358/474, 358/475, 482, 483, 1.15
See application file for complete search history.

(56) References Cited

U.S. PATENT DOCUMENTS 4,980,720 A 12/1990 Siegel

FOREIGN PATENT DOCUMENTS

| JP | 04-229848 A | 8/1992 |
| JP | 05-281621 A | 10/1993 |
| JP | 06-152866 A | 5/1994 |
| JP | 09-200456 A | 7/1997 |
| JP | 09-284486 A | 10/1997 |
| JP | 10-327325 A | 12/1998 |
| JP | 2001-313783 A | 11/2001 |
| JP | 2002-044383 A | 2/2002 |
| JP | 2002-142082 A | 5/2002 |
| JP | 2002-314760 A | 10/2002 |
| JP | 2003-259086 A | 9/2003 |
| JP | 2004-320538 A | 11/2004 |
| JP | 2007-152717 | * 6/2007 |
| JP | 2007-212949 A | 8/2007 |
| JP | 2007-288716 A | 11/2007 |

OTHER PUBLICATIONS

Japanese Office Action dated Mar. 27, 2012 issued in a corresponding Japanese Patent Application No. 2008-164801.

* cited by examiner

Primary Examiner — Houshang Safaipour
(74) Attorney, Agent, or Firm — Sughrue Mion, PLLC

(57) ABSTRACT

The image reading apparatus includes: an original placing unit on which an original is to be placed, and the original placing unit transmitting light applied onto an original surface of the original and light reflected by the original surface; a lighting unit having plural light-emitting elements arrayed in a line and lighting the original surface of the original placed on the original placing unit; an image signal generating unit receiving the light reflected by the original surface lit by the lighting unit and generating an image signal; a detecting unit detecting a position of the original surface; and a lighting-unit setting unit setting, by using a result of the detection by the detecting unit, the lighting unit at an angular position so that the image signal generating unit does not receive light emitted from an optical axis of the light-emitting elements and then reflected by the original surface.

11 Claims, 13 Drawing Sheets

IMAGE READING APPARATUS, CONTROLLER, IMAGE FORMING APPARATUS AND ANGULAR POSITION CONTROLLING METHOD

CROSS REFERENCE TO RELATED APPLICATIONS

This application is based on and claims priority under 35 USC §119 from Japanese Patent Application No. 2008-164801 filed Jun. 24, 2008.

BACKGROUND

1. Technical Field

The present invention relates to an image reading apparatus, a controller, an image forming apparatus and an angular position controlling method.

2. Related Art

Recently, there have been advances in technology for high-definition image reproduction for an image forming apparatus such as a printer or a copying machine. Correspondingly, an image sensor in which many photodetectors are densely arranged is used in an image reading apparatus, such as a scanner, which reads an original and provides image data to the image forming apparatus.

SUMMARY

According to an aspect of the invention, there is provided an image reading apparatus including: an original placing unit on which an original is to be placed, and the original placing unit transmitting light applied onto an original surface of the original and light reflected by the original surface; a lighting unit that has plural light-emitting elements arrayed in a line and that lights the original surface of the original placed on the original placing unit; an image signal generating unit that receives the light reflected by the original surface lit by the lighting unit and that generates an image signal; a detecting unit that detects a position of the original surface; and a lighting-unit setting unit that sets, by using a result of the detection by the detecting unit, the lighting unit at an angular position so that the image signal generating unit does not receive light emitted from an optical axis of the light-emitting elements and then reflected by the original surface.

BRIEF DESCRIPTION OF THE DRAWINGS

Exemplary embodiment(s) of the present invention will be described in detail based on the following figures, wherein.

DETAILED DESCRIPTION

An exemplary embodiment of the present invention will be described in detail below with reference to the accompanying drawings.

Figure 1:
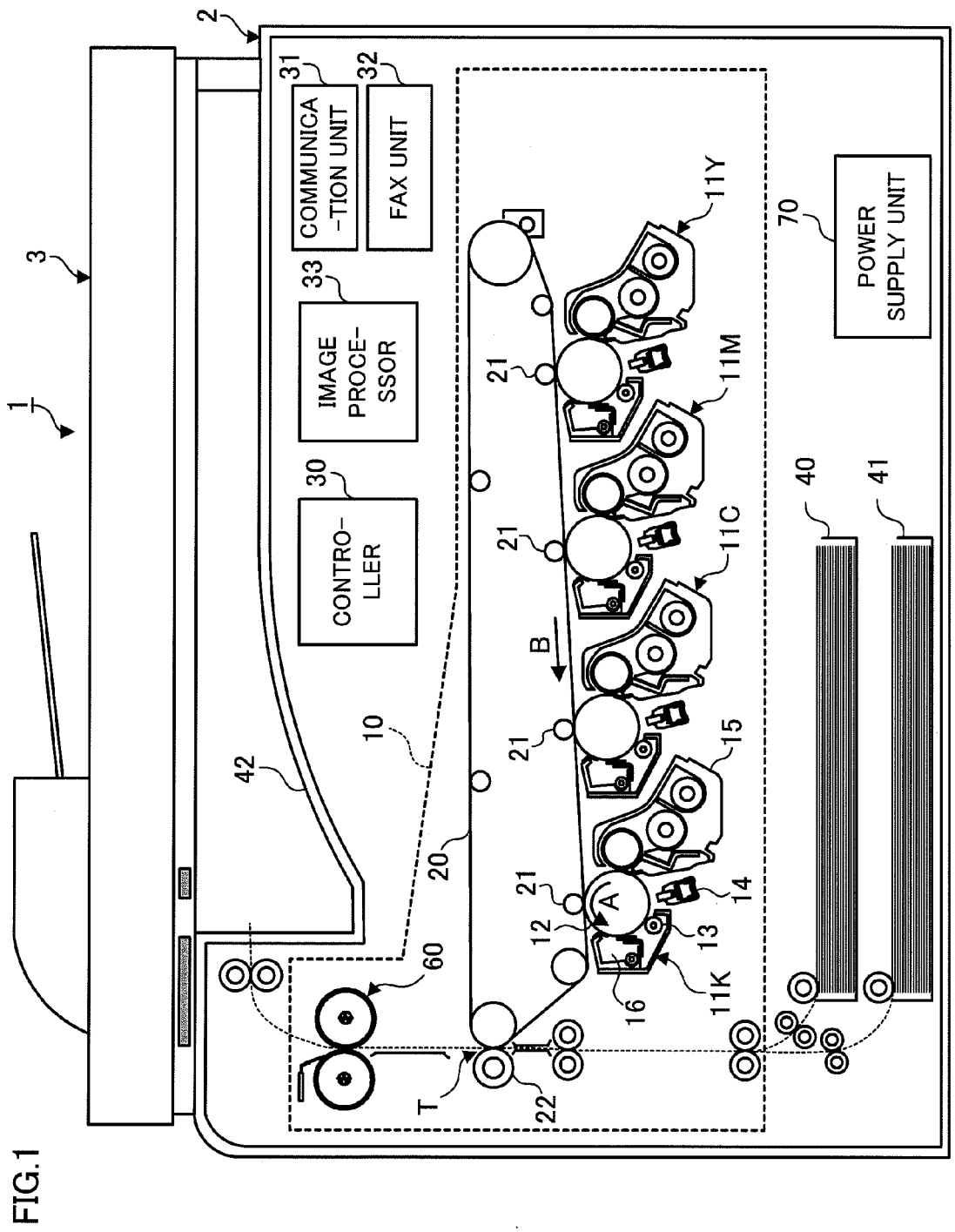
FIG. 1 is a diagram showing the overall configuration of an image forming apparatus including an image reading apparatus according to the exemplary embodiment.

FIG. 1 is a diagram showing the overall configuration of an image forming apparatus 1 including an image reading apparatus according to the exemplary embodiment. The image forming apparatus 1 shown in FIG. 1 is a multifunction machine having multiple functions of copying, printing, facsimile and the like, and is configured of a main unit 2, and an image scanner unit 3 employed as an example of an image reading apparatus (or an image reading unit).

The main unit 2 includes: an electrophotographic image forming processor 10 employed as an example of an image forming apparatus (or an image forming unit) that forms an image corresponding to different color image datasets; a controller 30 that controls operation of the overall image forming apparatus 1; a communication unit 31 that receives image data from an external device such as a personal computer (PC) via a network such as a local area network (LAN), a wide area network (WAN) or the Internet; a facsimile (fax) unit 32 that transmits and receives images through a public network; an image processor 33 that performs an image processing on image data provided from the communication unit 31, the fax unit 32 or the image scanner unit 3; and a power supply unit 70 that supplies power to these units.

The image forming processor 10 includes four image forming units 11Y, 11M, 11C and 11K (hereinafter collectively called "image forming units 11") arranged in side-by-side relation at intervals. Each of the image forming units 11 is configured for example of: a photoconductor drum 12 that forms an electrostatic latent image and carries a toner image; a charging device 13 that uniformly charges the surface of the photoconductor drum 12 at a potential; an LED print head (LPH) 14 that subjects the photoconductor drum 12 charged by the charging device 13 to exposure based on image data; a developing device 15 that develops the electrostatic latent image formed on the photoconductor drum 12: and a cleaner 16 that cleans the surface of the photoconductor drum 12 after transfer. Then, the image forming units 11 form yellow (Y), magenta (M), cyan (C) and black (K) toner images, respectively.

The image forming processor 10 further includes: an intermediate transfer belt 20 to which the respective color toner images formed on the photoconductor drums 12 of the image forming units 11 are transferred by multiple transfer; primary transfer rolls 21 that perform sequential transfer (or primary transfer) to transfer the respective color toner images formed by the image forming units 11, one after another, onto the intermediate transfer belt 20; a secondary transfer roll 22 that performs collective transfer (or secondary transfer) to transfer the superposed toner images transferred onto the intermediate transfer belt 20, at a time, to a sheet of paper used as a recording medium (e.g., recording paper); and a fixing device 60 that fixes the images transferred by the secondary transfer onto the sheet of paper.

In the main unit 2, the image data inputted from the image scanner unit 3, the communication unit 31 or the fax unit 32 is subjected to various image processings including shading correction, misalignment correction, a lightness or color space conversion process, and gamma correction, and further including frame erasing and various types of image editing such as color editing and move editing, by the image processor 33. Then, the color image data subjected to the image processing are provided to the respective image forming units 11.

The image forming unit 11K that forms the black (K) toner image, for example, is supplied with the K color image data that is subjected to the image processing. Then, the photoconductor drum 12 that rotates in the direction of an arrow A of FIG. 1 is uniformly charged at a potential by the charging device 13, and is subjected to exposure by the LPH 14 that emits light in accordance with the K color image data. Thereby, the electrostatic latent image for the K color image is formed on the photoconductor drum 12. Further, the electrostatic latent image formed on the photoconductor drum 12 is developed by the developing device 15, thereby to form a K color toner image on the photoconductor drum 12. The image forming units 11Y, 11M and 11C likewise form the Y, M and C color toner images, respectively.

The respective color toner images that are formed by the image forming units 11 are electrostatically transferred one after another onto the intermediate transfer belt 20 that moves in the direction of an arrow B of FIG. 1 by the primary transfer rolls 21, thereby to form combined toner images in which respective color toner images are superposed with each other. The combined toner images on the intermediate transfer belt 20 are transported to a region (i.e., a secondary transfer portion T) where the secondary transfer roll 22 is placed, as the intermediate transfer belt 20 moves. When the combined toner images are transported to the secondary transfer portion T, a sheet of paper is transported from a paper tray 40 or a paper tray 41 to the secondary transfer portion T in accordance with the timing of transport of the combined toner images to the secondary transfer portion T. Then, the combined toner images are electrostatically transferred at a time onto the transported sheet of paper by using a transfer electric field formed at the secondary transfer portion T by the secondary transfer roll 22.

After that, the sheet of paper having the combined toner images electrostatically transferred thereto is peeled off from the intermediate transfer belt 20, and is transported to the fixing device 60. The combined toner images on the sheet of paper transported to the fixing device 60 are fixed on the sheet of paper by being subjected to a fixing process through the application of heat and pressure by the fixing device 60. Then, the sheet of paper having the fixed image formed thereon is transported to a paper stacking portion 42 provided in an exit portion of the main unit 2.

According to this manner, image formation is executed in the main unit 2 by repeating the above cycle by the number of sheets to be printed.

Note that, instead of electrophotography, any one of various image forming methods for forming an image on a sheet of paper, such as electrostatic recording or ionography method, may be employed for the image forming processor 10.

A description will be given with regard to the image scanner unit 3.

The image scanner unit 3 reads an image on an original, generates image data, and transmits the generated image data to the main unit 2.

Figure 2:
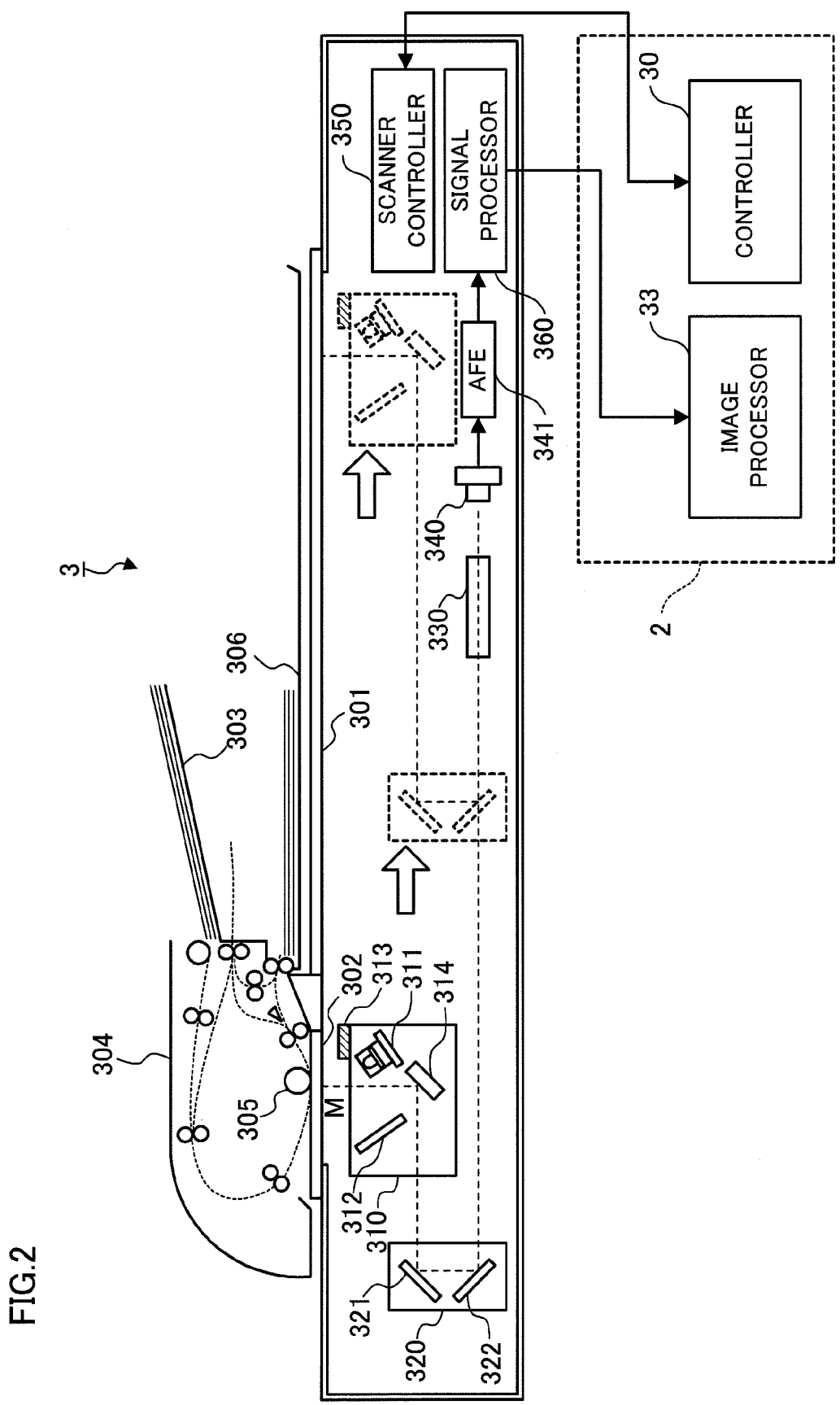
FIG. 2 is a diagram of assistance in explaining the configuration of the image scanner unit.

FIG. 2 is a diagram of assistance in explaining the configuration of the image scanner unit 3 according to the exemplary embodiment. As shown in FIG. 2, the image scanner unit 3 includes a first platen glass 301 employed as an example of an original placing unit on which the original is placed in a stationary state, and a second platen glass 302 that forms a light aperture (i.e., a read point M) to read the original being transported. Further, the image scanner unit 3 includes an original tray 303 on which multiple originals are placed; an original transport unit 304 that transports the original so that one or both surfaces of the original placed on the original tray 303 passes through the reading point M of the second platen glass 302; a platen roll 305 that brings the original into intimate contact with the second platen glass 302 at the reading point M; and a stacking tray 306 that stacks the read originals.

Furthermore, the image scanner unit 3 includes a full rate carriage 310 that reads an image while being in a stationary state at the reading point M of the second platen glass 302 or while scanning throughout the first platen glass 301; and a half rate carriage 320 that guides light obtained from the full rate carriage 310 to a CCD image sensor 340 (to be described later).

The full rate carriage 310 includes a lighting unit 311 employed as an example of a lighting unit including an LED array formed of an array of multiple high-intensity white LEDs employed as an example of light emitting elements as a light source that irradiates the original with light; a diffuse-reflection member 312 employed as an example of a diffuse-reflection unit that reflects the light emitted from the lighting unit 311 toward the original surface while diffusing the light; a detecting sensor 313 employed as an example of a detecting unit that detects whether the distance from a reference plane to the original surface exceeds a value set in advance or other situations, the reference plane being a location set in advance, for example, on the surface of the first platen glass 301, or the like; and a first mirror 314 that reflects the reflected light obtained from the original surface toward the half rate carriage 320. Here, the lighting unit 311 and the diffuse-reflection member 312 are supported by supporting members that rotate about the axis of rotation perpendicular to the scanning direction of the full rate carriage 310. Then, if the distance to the original surface detected by the detecting sensor 313 exceeds the value set in advance, the lighting unit 311 and the diffuse-reflection member 312 are each rotated at an angle set in advance. Note that, a detailed description will be given later with regard to the configuration of the full rate carriage 310 and the rotational operations of the lighting unit 311 and the diffuse-reflection member 312.

The half rate carriage 320 includes a second mirror 321 and a third mirror 322 that guide the light obtained from the full rate carriage 310 to the CCD image sensor 340.

Still furthermore, the image scanner unit 3 includes an focusing lens 330 that optically reduces the size of an optical image obtained from the half rate carriage 320; the charge coupled device (CCD) image sensor 340 employed as an example of an image signal generating unit that generates RGB color signals (or image signals) by photoelectrically converting the optical image formed by the focusing lens 330; and an analog front end (AFE) 341 that performs sample hold, offset adjustment or analog-to-digital conversion on the RGB color signals generated by the CCD image sensor 340.

Still furthermore, the image scanner unit 3 includes a scanner controller 350 employed as an example of a controller that controls operation of the image scanner unit 3; and a signal processor 360 that processes the RGB color signals and thereby generates image data, the RGB color signals converted in digital form by the AFE 341 and provided from the CCD image sensor 340. Here, the scanner controller 350 and the signal processor 360 are respectively connected by signal lines to the controller 30 and the image processor 33 of the main unit 2 thereby to mutually transmit and receive control signals, image data or the like.

In the image scanner unit 3 according to the present exemplary embodiment, to read the original placed on the first platen glass 301, the controller 30 of the main unit 2 gives the scanner controller 350 an command to read the original placed on the first platen glass 301, on the basis of a user's operation input from an operation panel (not shown in the figure) of the main unit 2.

Upon receipt of the command to read the original placed on the first platen glass 301 from the controller 30 of the main unit 2, the scanner controller 350 effects movement of the full rate carriage 310 and the half rate carriage 320 at a ratio of 2 to 1 in the scanning direction (in the direction indicated by the arrow in FIG. 2), as shown with the broken lines in FIG. 2. Further, the lighting unit 311 of the full rate carriage 310 emits light to irradiate the original surface. Thereby, the reflected light from the original is guided through the first mirror 314, the second mirror 321 and the third mirror 322 to the focusing lens 330. The light guided to the focusing lens 330 is focused to form an image on a light receiving surface of the CCD image sensor 340. The CCD image sensor 340 is configured for example of a set of three arrays of one-dimensional sensors for red (R), green (G) and blue (B) colors, and performs simultaneous processing on each line for each color. Then, reading in the line direction is executed by scanning of the entire original size thereby to read a page of the original.

RGB color signals obtained by the CCD image sensor 340 are provided to the signal processor 360.

On the other hand, in the image scanner unit 3, to read the original placed on the original tray 303, the controller 30 of the main unit 2 instructs the scanner controller 350 to read the original placed on the original tray 303, on the basis of a user's operation input through the operation panel (not shown in the figure) of the main unit 2.

Upon receipt of a command to read the original placed on the original tray 303 from the controller 30 of the main unit 2, the scanner controller 350 causes the original transport unit 304 to transport the original placed on the original tray 303 to the read point M of the second platen glass 302. At this time, the full rate carriage 310 and the half rate carriage 320 are set in a stopped state in the solid line position in FIG. 2. Then, the lighting unit 311 of the full rate carriage 310 emits light to irradiate the original surface. Thereby, the reflected light from the original in intimate contact with the second platen glass 302 by the platen roll 305 is guided through the first mirror 314, the second mirror 321 and the third mirror 322 to the focusing lens 330. The light guided to the focusing lens 330 is focused to form an image on the light receiving surface of the CCD image sensor 340. The CCD image sensor 340 performs simultaneous processing on each line for each of the RGB colors. Then, the overall original is caused to pass through the read point M of the second platen glass 302, and thereby, one page of original is read.

RGB color signals obtained by the CCD image sensor 340 are provided to the signal processor 360.

To generate the respective color image data, the signal processor 360 performs various types of signal processing such as shading correction for correcting shading data obtained by the CCD image sensor 340 having a set of three arrays for three RGB colors; GAP correction for correcting a reading time lag caused between the RGB color signals due to the offset of the color read positions in the slow scan direction in the CCD image sensor 340 for the three RGB colors; and a color space conversion for converting the RGB color signals into color signals for example in L*a*b* color space. Note that, the respective color image data may be outputted as the color signals in the L*a*b* color space, or the respective color image data may be mapped in the L*a*b* color space and then outputted as the color signals for example in the CMYK color space that is an output color space of the main unit 2.

Then, the signal processor 360 outputs the generated color image data to the image processor 33 of the main unit 2.

Figure 3:
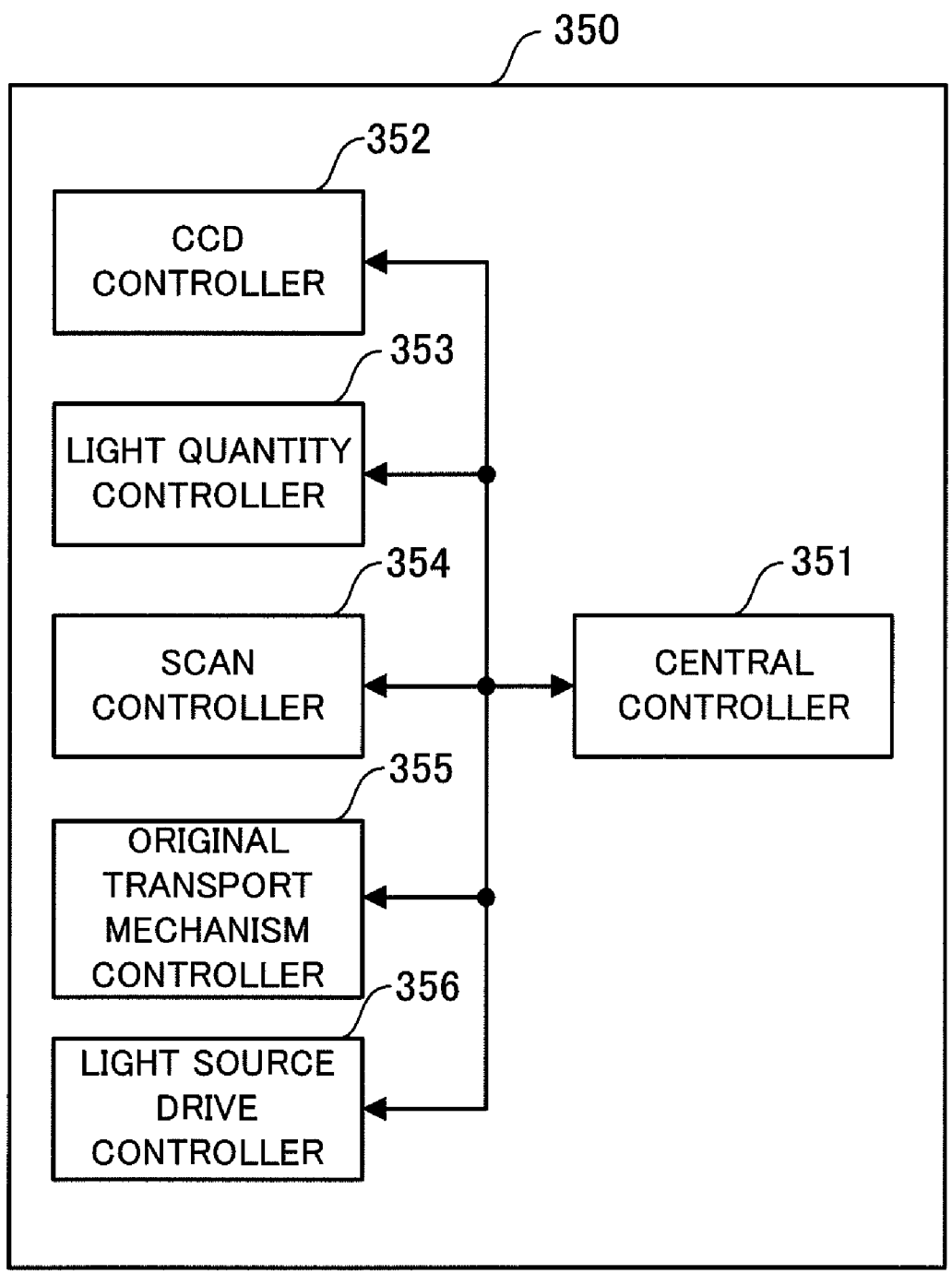
FIG. 3 is a block diagram of assistance in explaining the configuration of the scanner controller.

As shown in FIG. 3 (which is a block diagram of assistance in explaining the configuration of the scanner controller 350), the scanner controller 350 includes a central controller 351 that controls the entire operation of the image scanner unit 3; a CCD controller 352 that controls the CCD image sensor 340; a light quantity controller 353 employed as an example of a light quantity controller that controls the quantity of light emitted by the lighting unit 311 of the full rate carriage 310; a scan controller 354 that controls scanning operations of the full rate carriage 310 and the half rate carriage 320; and an original transport mechanism controller 355 that controls various operations including control of various types of double-side reading and one-side reading in the original transport unit 304.

Further, the scanner controller 350 includes a light source drive controller 356 employed as an example of an angular position controller, a diffuse-reflection unit setting unit and a diffuse-reflection unit controller that acquires the detected value from the detecting sensor 313 of the full rate carriage 310, determines the distance to the original surface, and controls operation of a light source drive mechanism rotating the lighting unit 311 and the diffuse-reflection member 312 on the basis of the determined result.

In the scanner controller 350, various controllers included therein output control signals to parts that constitute the image scanner unit 3. Then, the scanner controller 350 controls operation of the image scanner unit 3 on the basis of the various control signals from the scanner controller 350. On that occasion, the central controller 351 of the scanner controller 350 controls operations of the various controllers on the basis of a control signal from the controller 30 of the main unit 2.

For example, the central controller 351 sets an original read mode on the basis of the control signal from the controller 30 of the main unit 2. Then, the central controller 351 controls the light source drive controller 356, the original transport mechanism controller 355, or the like. Here, a sheet mode to read an original in sheet form or a book mode to read an original in book form is selected as the read mode. Further, for example, a double-side simultaneous read mode in which reading is performed by a single pass (without reversal), a reverse double-side read mode in which reading is performed by a reversal pass, a one-side read mode in which reading is performed by a single pass, or the like is selected.

Further, the central controller 351 automatically selects the reading of the original placed on the first platen glass 301 or the reading of the original placed on the original tray 303, on the basis of a sensor output or the like as to detect the presence or absence of the original on the original tray 303, and controls the original transport mechanism controller 355 or the like.

Next, a description will be given with regard to the full rate carriage 310.

Figure 4:
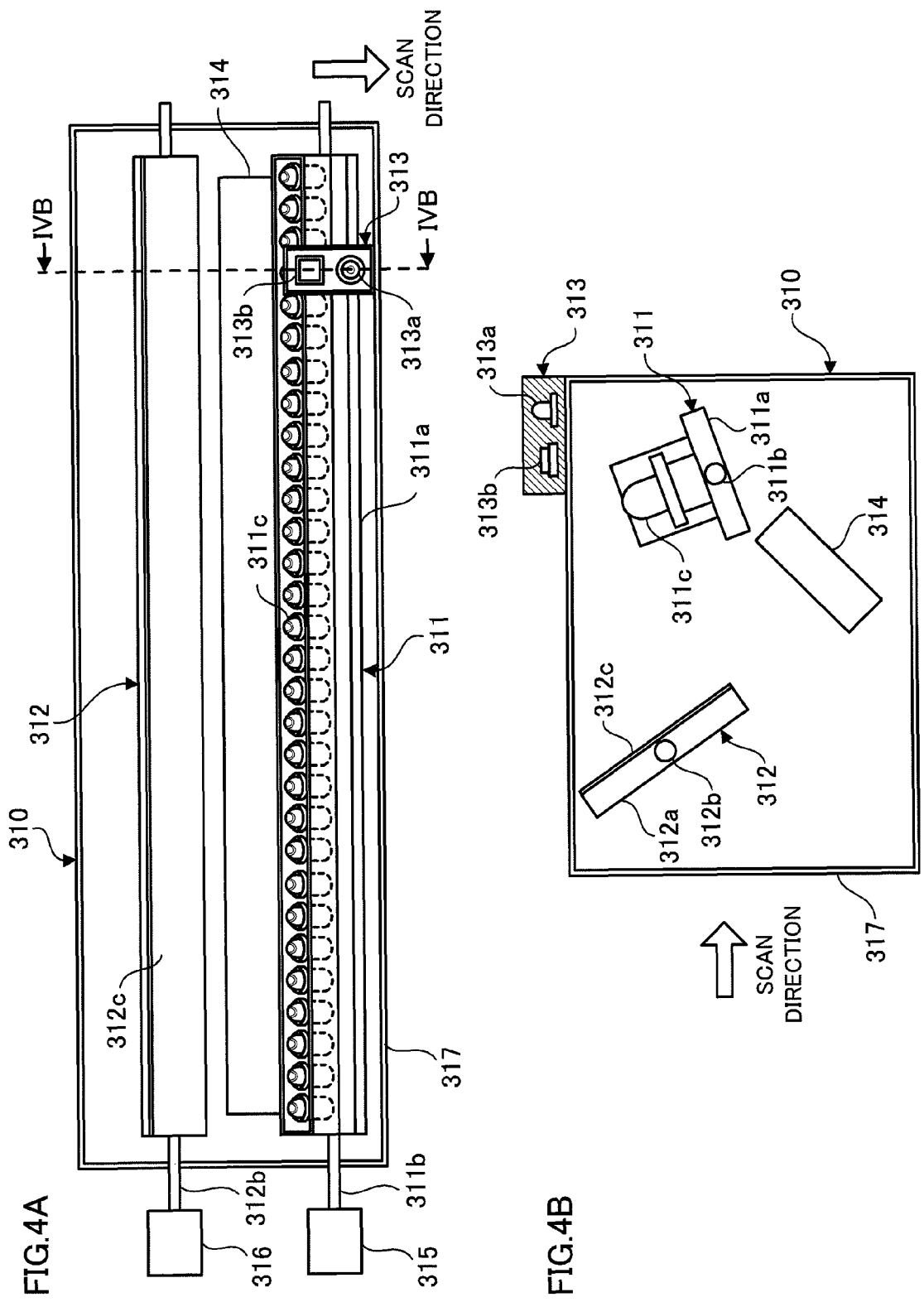
FIGS. 4A and 4B are views of assistance in explaining the configuration of the full rate carriage.

FIGS. 4A and 4B are views of assistance in explaining the configuration of the full rate carriage 310. FIG. 4A is a view of the full rate carriage 310 as seen from above (or from the first platen glass 301 side), and FIG. 4B is a sectional view taken along the line IVB-IVB of FIG. 4A. As described with reference to FIG. 2, in the full rate carriage 310, the lighting unit 311, the diffuse-reflection member 312, the detecting sensor 313 and the first mirror 314 are arranged.

As shown in FIGS. 4A and 4B, the lighting unit 311 of the full rate carriage 310 includes an LED array 311c serving as a light source that irradiates the original with light and that is formed of multiple high-intensity white LEDs arrayed in a direction perpendicular to the scan direction; a supporting member 311a that supports the LED array 311c; and a rotating shaft 311b that rotatably supports the supporting member 311a with a frame 317 of the full rate carriage 310. Then, a first motor 315 that rotates the supporting member 311a at an angle set in advance through the rotating shaft 311b is disposed at one end of the rotating shaft 311b.

Note that, the first motor 315, the rotating shaft 311b, the light source drive controller 356, and further, other components as needed constitute a lighting-unit setting unit.

As mentioned above, the image scanner unit 3 according to the present exemplary embodiment uses the high-intensity white LEDs having high luminous efficiency, as a light source that irradiates the original with light. This enables increasing the quantity of light reflected by the original surface, and thus reducing the chip size of each photocell that constitutes the CCD image sensor 340.

In other words, it is necessary to read an image on the original with high definition in order that the main unit 2 of the image forming apparatus 1 forms a high-definition image. Accordingly, it is required that the photocells of the CCD image sensor 340 that receives reflected light from the original become smaller in size and thereby the CCD image sensor 340 become higher in density. Also, the size reduction of the photocell is effective in reducing a manufacturing cost for the CCD image sensor 340.

However, the size reduction of the photocells of the CCD image sensor 340 leads to a decrease in the quantity of light received by each photocell. This causes a decrease in an S/N ratio of RGB color signals generated by the CCD image sensor 340, thus increasing the likelihood of a read error occurring. It is therefore necessary to increase the quantity of light emitted by the light source that irradiates the original. However, increasing the quantity of light emitted by for example a xenon lamp that has heretofore been used as the light source requires the supply of large power and thus causes an increase in power consumption, as well as increases the heat generation amount of the light source, and also raises the temperature of the image scanner unit 3 to a large extent.

As opposed to that, the high-intensity white LED is high in luminous efficiency and thus is low in power consumption, and also is low in heat generation amount. Thus, the use of the high-intensity white LED as the light source ensures a sufficient quantity of light for each small-sized photocell and thus reduces the likelihood of the read error occurring, and also, this is highly effective in power saving and also reduces the likelihood of the problem of temperature rise occurring.

Therefore, the image scanner unit 3 according to the present exemplary embodiment uses the LED array 311c, formed of an array of the multiple high-intensity white LEDs, in the lighting unit 311 of the full rate carriage 310.

The diffuse-reflection member 312 of the full rate carriage 310 includes a diffuse-reflector 312c that reflects light emitted from the LED array 311c toward the original surface while diffusing the light, a supporting member 312a that supports the diffuse-reflector 312c, and a rotating shaft 312b that rotatably supports the supporting member 312a with respect to the frame 317 of the full rate carriage 310. Furthermore, a second motor 316 that rotates the supporting member 312a through the rotating shaft 312b is disposed at one end of the rotating shaft 312b.

Further, the detecting sensor 313 includes a light source 313a that irradiates the original surface with light, and a light receiving sensor 313b that receives light reflected by the original surface. The detecting sensor 313 transmits the detected value of the quantity of light received by the light receiving sensor 313b to the light source drive controller 356 of the scanner controller 350.

The first mirror 314 reflects the reflected light obtained by the original surface toward the half rate carriage 320.

Next, a description will be given with regard to the angular position of the LED array 311c arranged in the lighting unit 311.

Figure 5:
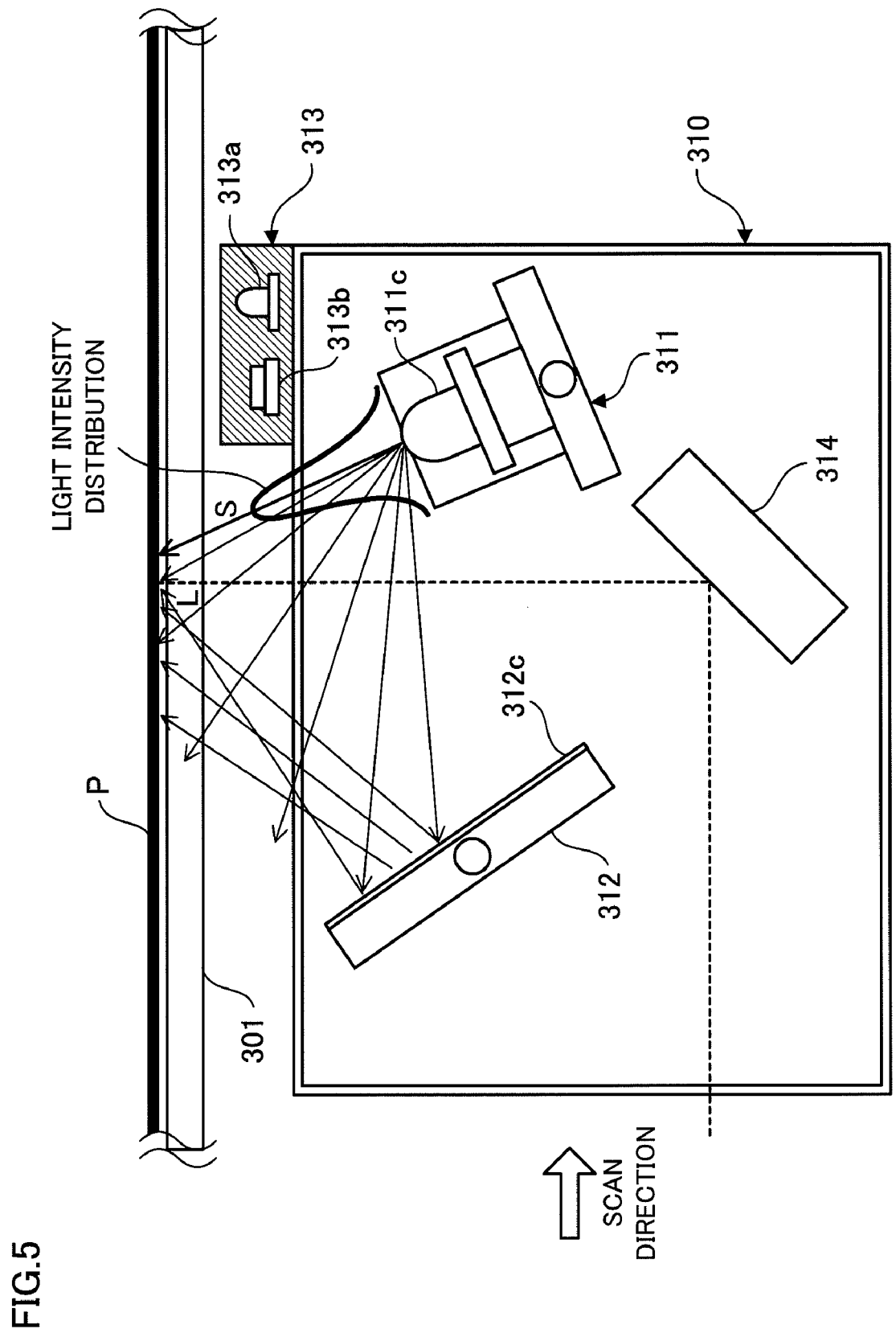
FIG. 5 is a view of assistance in explaining the angular position of the LED array in a plane perpendicular to the LED array.

FIG. 5 is a view of assistance in explaining the angular position of the LED array 311c in a plane perpendicular to the LED array 311c (or in the drawing of FIG. 5). Firstly, the high-intensity white LEDs that have high luminous efficiency and constitute the LED array 311c have the characteristic of having high directivity of emitted light. Thus, as shown in FIG. 5, the intensity distribution of light emitted from each of the high-intensity white LEDs (light intensity distribution) is highest in the vicinity of an optical axis S, and becomes sharply lower in an area farther from the optical axis S. Accordingly, if the optical axis S is brought into coincidence with a read point L of an original P, a light quantity density at the read point L becomes too high, and thus, there is a small difference in reflectance between an image on the original P and the unprinted surface (or a sheet) of the original P. In other words, ordinary, the absorption of light in an image portion produces the difference in reflectance between the image on the original P and the unprinted surface of the original P, and thus, the image is recognized. However, since the light intensity of the high-intensity white LED is high, the light quantity density at the read point L becomes too high. Thus, light passes through the image in the image portion of the original P, and, the ratio of reflected light from the unprinted surface of the original P to reflected light from the image portion becomes high. For this reason, light having the same reflectance as that of the light from the unprinted surface of the original P is obtained from the image portion, resulting in a phenomenon in which a luminescent spot of each of the high-intensity white LEDs that irradiates the original P appears in spot form (that is, a spotting phenomenon).

Note that, the phrase "the optical axis S of the high-intensity white LED" in the above description refers to a ray axis on which the intensity of light emitted from each high-intensity white LED is highest.

Therefore, as shown in FIG. 5, in the lighting unit 311 according to the present exemplary embodiment, the LED array 311c is arranged at such an angle that the optical axis S of each of the high-intensity white LEDs constituting the LED array 311c does not coincide with the read point L of the original P. Thereby, the configuration is such that light from the high-intensity white LEDs does not converge on the read point L but is diffused for irradiation thereby to make the light quantity density at the read point L appropriate. The tilt direction of the LED array 311c may possibly be the direction in which the LED array 311c is located away from the first mirror 314, from the viewpoint of suppression of light leaking to the first mirror 314.

The diffuse-reflection member 312 is located on the opposite side to the lighting unit 311 in the scan direction with respect to the read point L. Thereby, the configuration is such that light emitted from the LED array 311c is applied to the original surface while being diffused, thereby to make the distribution of irradiated light quantity at the read point L uniform.

A description will be given with regard to a change of the angular position of the LED array 311c in a situation where the original P placed on the first platen glass 301 is, for example, a book formed of multiple sheets of paper folded and bound in a central portion.

If the original P in book form (called "book original") is placed on the first platen glass 301, there is a gap between the book original P and the first platen glass 301 at a folded portion Q of the central portion. Such a gap between the book original P and the first platen glass 301 at the folded portion Q may sometimes be reduced by pressing the folded portion Q from above, but the reduction depends on the number of pages of the book original P, the stiffness of the book original P, or the like. Therefore, the book original P having a large number of pages generally has difficulty in eliminating the gap between the book original P and the first platen glass 301 at the folded portion Q. Thus, if there is a large amount of gap between the book original P and the first platen glass 301 at the folded portion Q, a situation may arise where the optical axis S of the LED array 311c (that is, the optical axis S of light emitted from each of the high-intensity white LEDs) coincides with the read point L of the original P at the folded portion Q.

Figure 6:
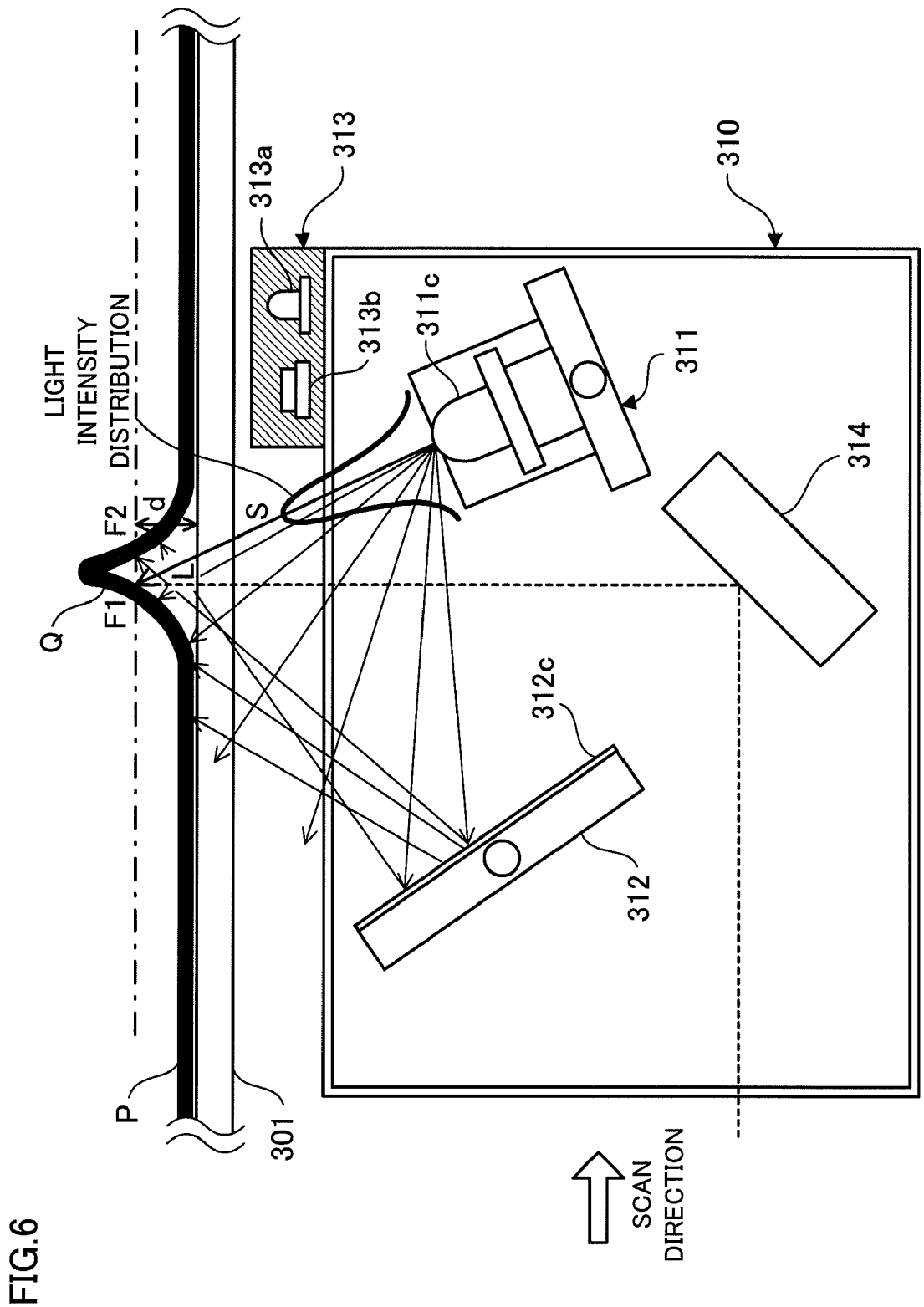
FIG. 6 is a view of assistance in explaining the situation where the optical axis of the LED array coincides with the read point of the original at the folded portion.

FIG. 6 is a view of assistance in explaining the situation where the optical axis S of the LED array 311c coincides with the read point L of the original P at the folded portion Q. As shown in FIG. 6, in the lighting unit 311 according to the present exemplary embodiment, the angular position of the LED array 311c is set so that the optical axis S of the LED array 311c does not coincide with the read point L, assuming that the original P is in intimate contact with the first platen glass 301. However, if there is a large amount of gap between the book original P and the first platen glass 301 at the folded portion Q, the optical axis S of the LED array 311c first coincides with the read point L at a position F1 of the folded portion Q, when the full rate carriage 310 performs scanning. Further, the optical axis S of the LED array 311c then coincides with the read point L at a position F2 of the folded portion Q, when the full rate carriage 310 performs scanning.

Thus, if the angular position of the LED array 311c remains in the configuration to cause the optical axis S of the LED array 311c not to coincide with the read point L while assuming that the original P is in intimate contact with the first platen glass 301, the above-mentioned spotting phenomenon occurs at the positions F1 and F2 of the folded portion Q and further in the vicinity of these positions.

Therefore, in the image scanner unit 3 according to the present exemplary embodiment, the angular position of the LED array 311c is changed while the read point L travels from the position F1 of the folded portion Q at which the optical axis S of the LED array 311c (the high-intensity white LEDs) first coincides with the read point L of the full rate carriage 310, to the position F2 of the folded portion Q at which the optical axis S then coincides with the read point L. Thereby, setting is such that the optical axis S of the LED array 311c does not coincide with the read point L even at the positions F1 and F2.

Note that, d indicates the distance (or gap) between the top surface of the first platen glass 301 and the positions F1 and F2 at which the optical axis S of the LED array 311c coincides with the read point L of the full rate carriage 310.

Next, a description will be given with regard to a mechanism to change the angular position of the LED array 311c.

FIGS. 7 to 10 are views of assistance in explaining the mechanism to change the angular position of the LED array 311c. The full rate carriage 310 according to the present exemplary embodiment includes, as the mechanism to change the angular position of the LED array 311c, the detecting sensor 313, the first motor 315 (see FIGS. 4A and 4B) employed as an example of a light source drive mechanism that rotates the supporting member 311a that supports the LED array 311c, through the rotating shaft 311b, the second motor 316 (see FIGS. 4A and 4B) employed as an example of a light source drive mechanism that rotates the supporting member 312a that supports the diffuse-reflector 312c, through the rotating shaft 312b, and the light source drive controller 356 (see FIG. 3) that acquires the detected value from the detecting sensor 313 of the full rate carriage 310, determines the distance to the original P, and controls the operation of the light source drive mechanism (i.e., the first motor 315 and the second motor 316) rotating the lighting unit 311 and the diffuse-reflection member 312 on the basis of the determined result.

For example, if a user selects the book mode to read an original of the book original P through the operation panel (not shown in the figure) of the main unit 2, the central controller 351 of the scanner controller 350 sets the book mode on the basis of a control signal from the controller 30 of the main unit 2. The central controller 351, after setting the book mode, instructs the light source drive controller 356 to bring the detecting sensor 313 into operation in order for the detecting sensor 313 to detect the distance between the surface of the first platen glass 301 and the surface of the book original P.

Thereby, in the detecting sensor 313, the light source 313a irradiates the original surface of the book original P with light while the light receiving sensor 313b receives light reflected by the original surface. Then, the detecting sensor 313 transmits the detected value of the quantity of light received by the light receiving sensor 313b to the light source drive controller 356.

Figure 7:
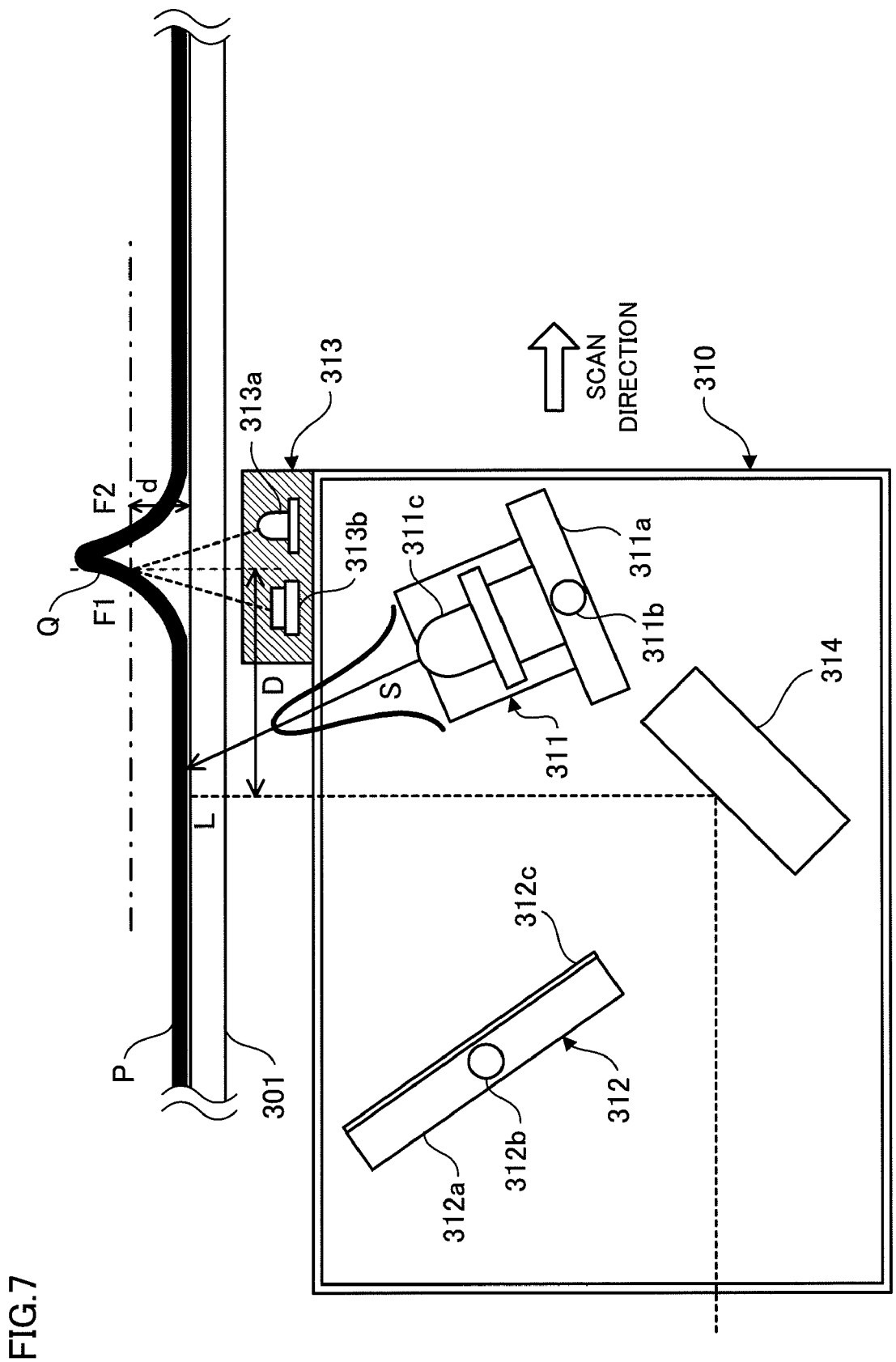
FIGS. 7 to 10 are views of assistance in explaining the mechanism to change the angular position of the LED array.

Then, as shown in FIG. 7, the light source drive controller 356 first detects the position F1 of the folded portion Q at which the optical axis S of the LED array 311c coincides with the read point L, that is, the position at which the distance between the top surface of the first platen glass 301 and the surface of the book original P exhibits the gap d as the detected value of the quantity of light, on the basis of the detected value of the light quantity obtained from the light receiving sensor 313b. Then, the light source drive controller 356 stores the timing of detection of the position F1. Thereby, the light source drive controller 356 calculates time (T1) between the detection of the position F1 by the detecting sensor 313 and the passage of the read point L of the full rate carriage 310 through the position F1, on the basis of a gap D between the detecting sensor 313 and the read point L of the full rate carriage 310, and the scan rate of the full rate carriage 310.

Figure 8:
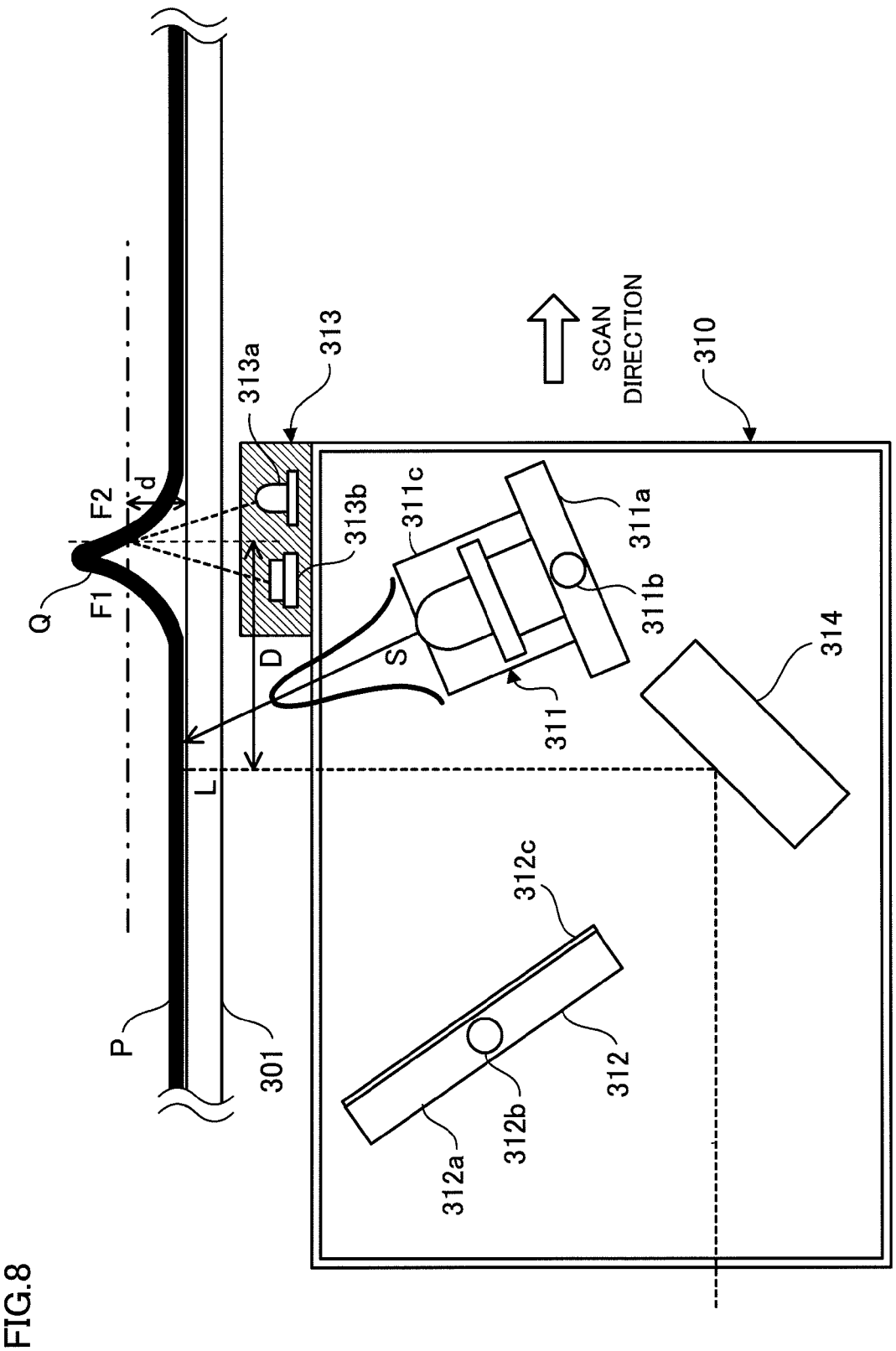

Further, as shown in FIG. 8, the light source drive controller 356 then detects the position F2 at which the optical axis S of the LED array 311c coincides with the read point L, that is, the position at which the distance between the surface of the first platen glass 301 and the surface of the book original P exhibits the gap d as the detected value of the quantity of light, on the basis of the detected value of the light quantity obtained from the light receiving sensor 313b. Then, the light source drive controller 356 stores the timing of detection of the position F2. Thereby, the light source drive controller 356 calculates time (T2) between the detection of the position F2 by the detecting sensor 313 and the passage of the read point L of the full rate carriage 310 through the position F2, on the basis of the gap D between the detecting sensor 313 and the read point L of the full rate carriage 310, and the scan rate of the full rate carriage 310.

Figure 9:
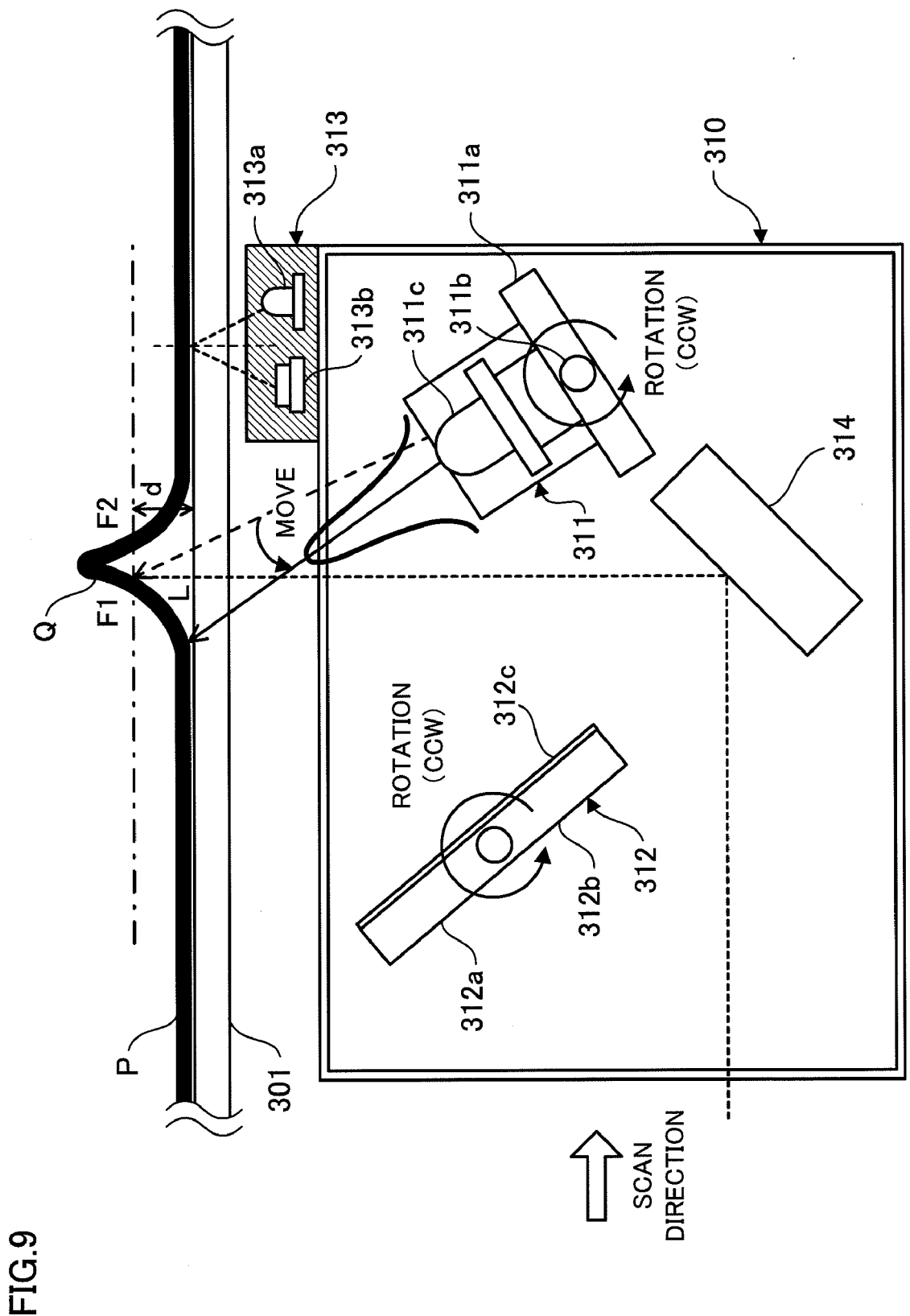

Then, the light source drive controller 356 rotates the first motor 315 at an angle set in advance in a counterclockwise direction (CCW), before the time (T1) elapses after the detection of the passage of the read point L through the position F1 by the detecting sensor 313. Thereby, as shown in FIG. 9, at the time when the full rate carriage 310 passes through the read point L that coincides with the position F1 of the book original P, the optical axis S of the LED array 311c moves from the direction set to avoid coincidence with the read point L while assuming that the original P is in intimate contact with the first platen glass 301, to the counterclockwise direction (CCW). Thus, the position F1 of the folded portion Q of the book original P located coinciding with the read point L is not irradiated directly with light emitted from the optical axis S of the LED array 311c. This provides the appropriate light quantity density at the read point L in the situation where the position F1 of the folded portion Q coincides with the read point L, thus suppressing the occurrence of the spotting phenomenon.

Also, the light source drive controller 356 rotates the second motor 316 in the counterclockwise direction (CCW), before the time (T1) elapses after the detection of the passage of the read point L through the position F1 by the detecting sensor 313. Thereby, the diffuse-reflector 312c likewise is tilted in the counterclockwise direction (CCW). The optical axis S of the LED array 311c is tilted in the counterclockwise direction (CCW), and thus the diffuse-reflector 312c likewise is tilted in the counterclockwise direction (CCW). Accordingly, light emitted from the LED array 311c is diffused and reflected by the diffuse-reflector 312c, which in turn suppresses light leaking to the first mirror 314.

Further, in synchronization with the tilting of the LED array 311c in the counterclockwise direction (CCW), the central controller 351 of the scanner controller 350 gives a command to increase the quantity of light emitted by the LED array 311c, to the light quantity controller 353 (see FIG. 3) that controls the quantity of light emitted by the lighting unit 311. Since the optical axis S of the LED array 311c is tilted in the counterclockwise direction (CCW), the light quantity at the read point L (the position F1) is reduced. Accordingly, the light quantity controller 353 performs control so as to increase the quantity of light emitted by the LED array 311c, and thereby, the light quantity at the read point L is maintained. Note that, the quantity of light emitted by an LED chip that constitutes the LED array 311c is controlled (PWM controlled) by a pulse width of a drive signal with which the LED chip is driven. Thus, specifically, the light quantity controller 353 performs control so as to increase the pulse width of the drive signal to the LED array 311c.

After that, the setting in which the optical axis S of the LED array 311c is moved in the counterclockwise direction (CCW) is continuously held until the time (T2) elapses after the detection of the passage of the read point L through the position F2 by the detecting sensor 313, that is, until the read point L finishes passing through the position F2 after passing through the position F1. While the read point L travels from the position F1 to the position F2, the distance between the top surface of the first platen glass 301 and the surface of the book original P at the read point L is greater than the gap d, whereas the optical axis S of the LED array 311c is moved in the counterclockwise direction (CCW). Thus, the setting in which the optical axis S of the LED array 311c is moved in the counterclockwise direction (CCW) is maintained, thereby maintaining a condition where the surface of the book original P is not irradiated directly with light emitted from the optical axis S of the LED array 311c, in a region between the positions F1 and F2.

Also, at the time when the read point L of the full rate carriage 310 coincides with the position F2 of the book original P, the position F2 is not irradiated directly with light emitted from the optical axis S of the LED array 311c, as in the case of the time of passage of the read point L that coincides with the position F1. This provides the appropriate light quantity density at the read point L in the situation where the position F2 of the folded portion Q coincides with the read point L, thus suppressing the occurrence of the spotting phenomenon.

Figure 10:
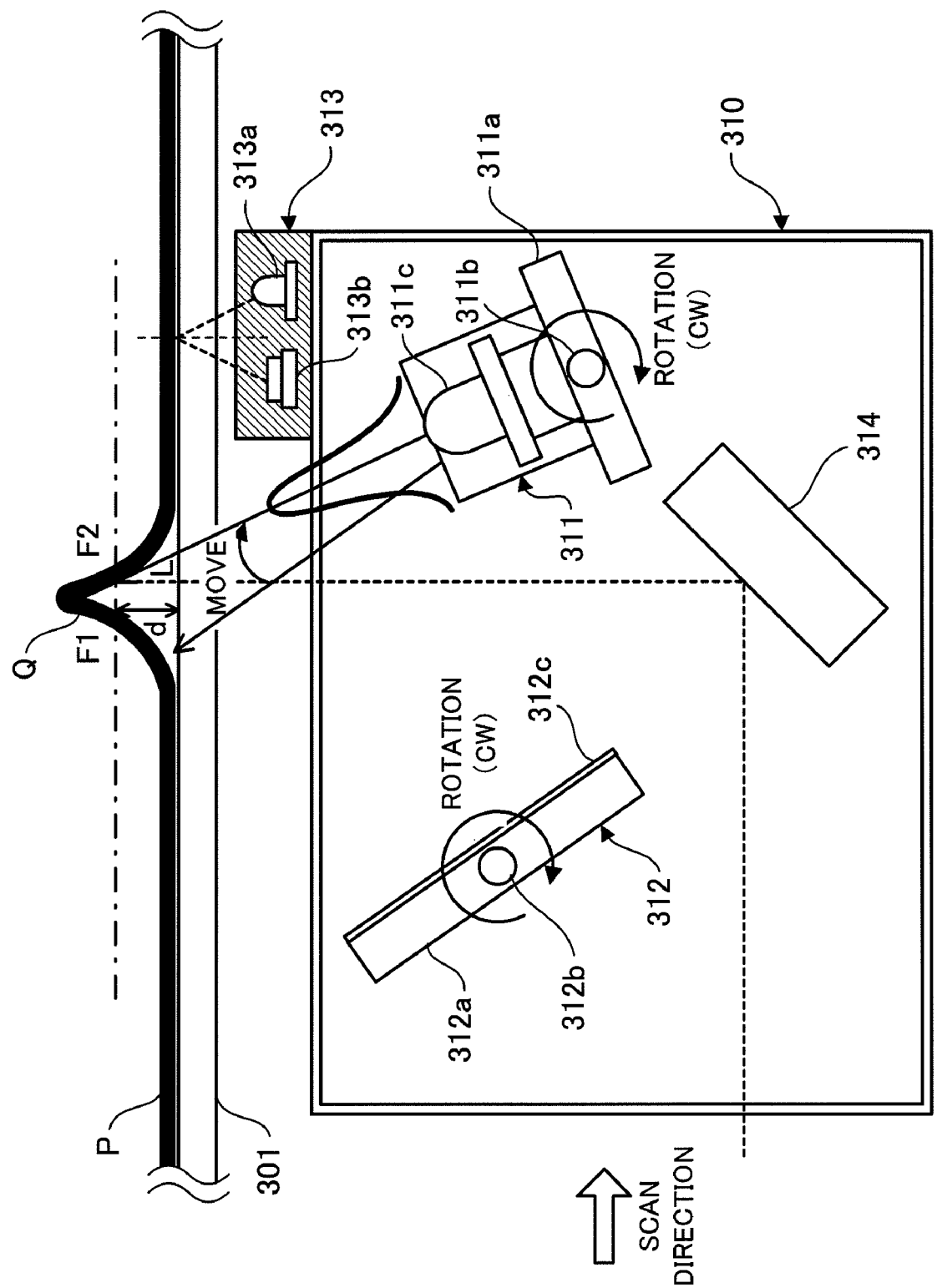

Subsequently, the light source drive controller 356 rotates the first motor 315 at an angle set in advance in a clockwise direction (CW), after the time (T2) has elapsed after the detection of the passage of the read point L through the position F2 by the detecting sensor 313. Thereby, as shown in FIG. 10, after the read point L of the full rate carriage 310 has passed through the position F2 of the book original P, the optical axis S of the LED array 311c is restored to its original position. For this reason, a plane portion of the book original P in intimate contact with the first platen glass 301 is not irradiated directly with light emitted from the optical axis S of the LED array 311c. This provides the appropriate light quantity density at the read point L in the plane portion of the book original P, thus suppressing the occurrence of the spotting phenomenon.

Also, the light source drive controller 356 rotates the second motor 316 in the clockwise direction (CW), after the time (T2) has elapsed after the detection of the passage of the read point L through the position F2 by the detecting sensor 313. Thereby, the diffuse-reflector 312c is likewise restored to its original position.

Moreover, in synchronization with the tilting of the LED array 311c in the clockwise direction (CW), the central controller 351 of the scanner controller 350 gives a command to restore the quantity of light emitted by the LED array 311c to its initial setting, to the light quantity controller 353 that controls the quantity of light emitted by the lighting unit 311.

Next, a description will be given with regard to a process for changing the angular position of the LED array 311c, which is executed by the scanner controller 350.

Figure 11:
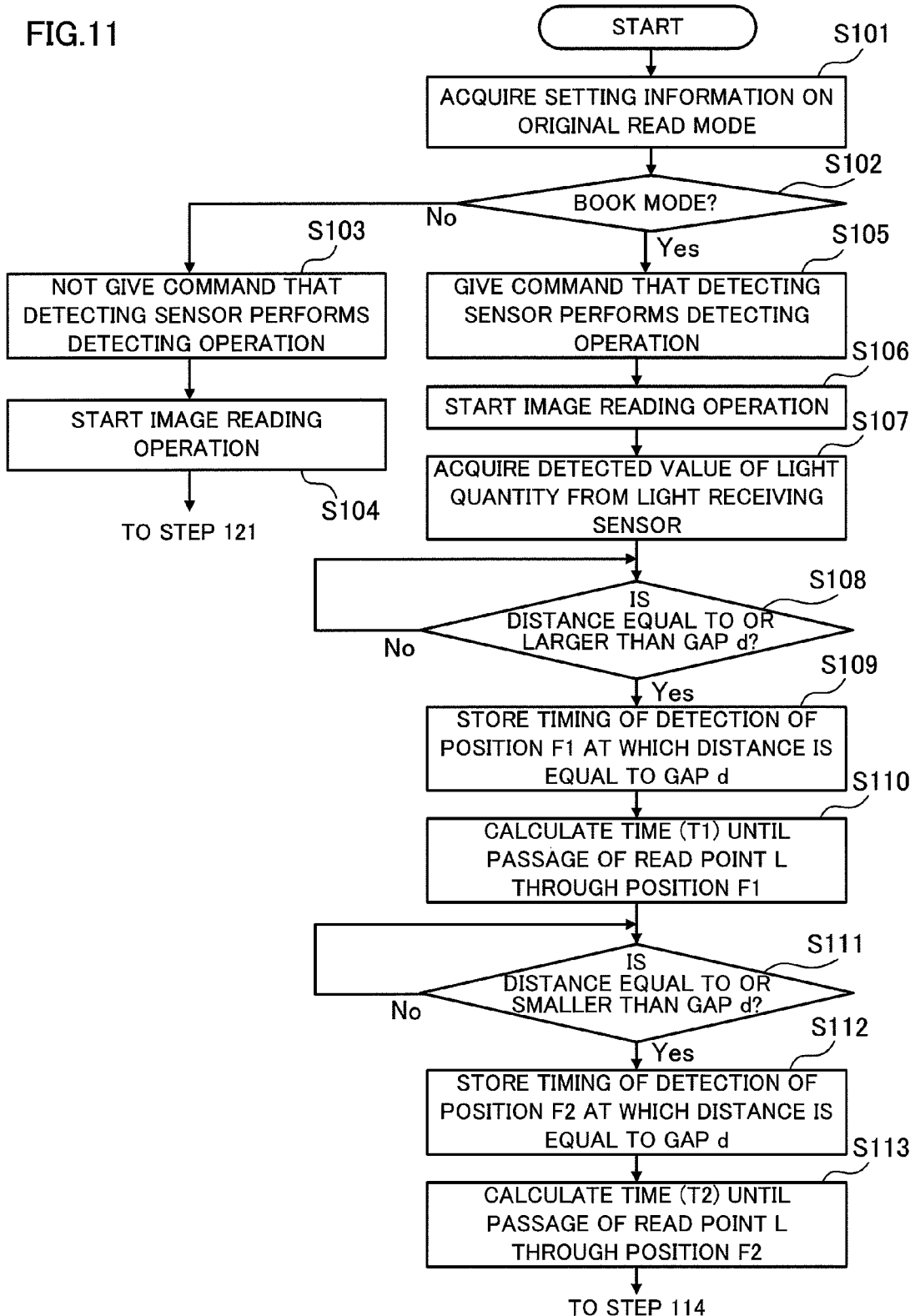
FIGS. 11 and 12 are flowcharts showing an example of a procedure of the process for changing the angular position of the LED array, which is executed by the scanner controller.
Figure 12:
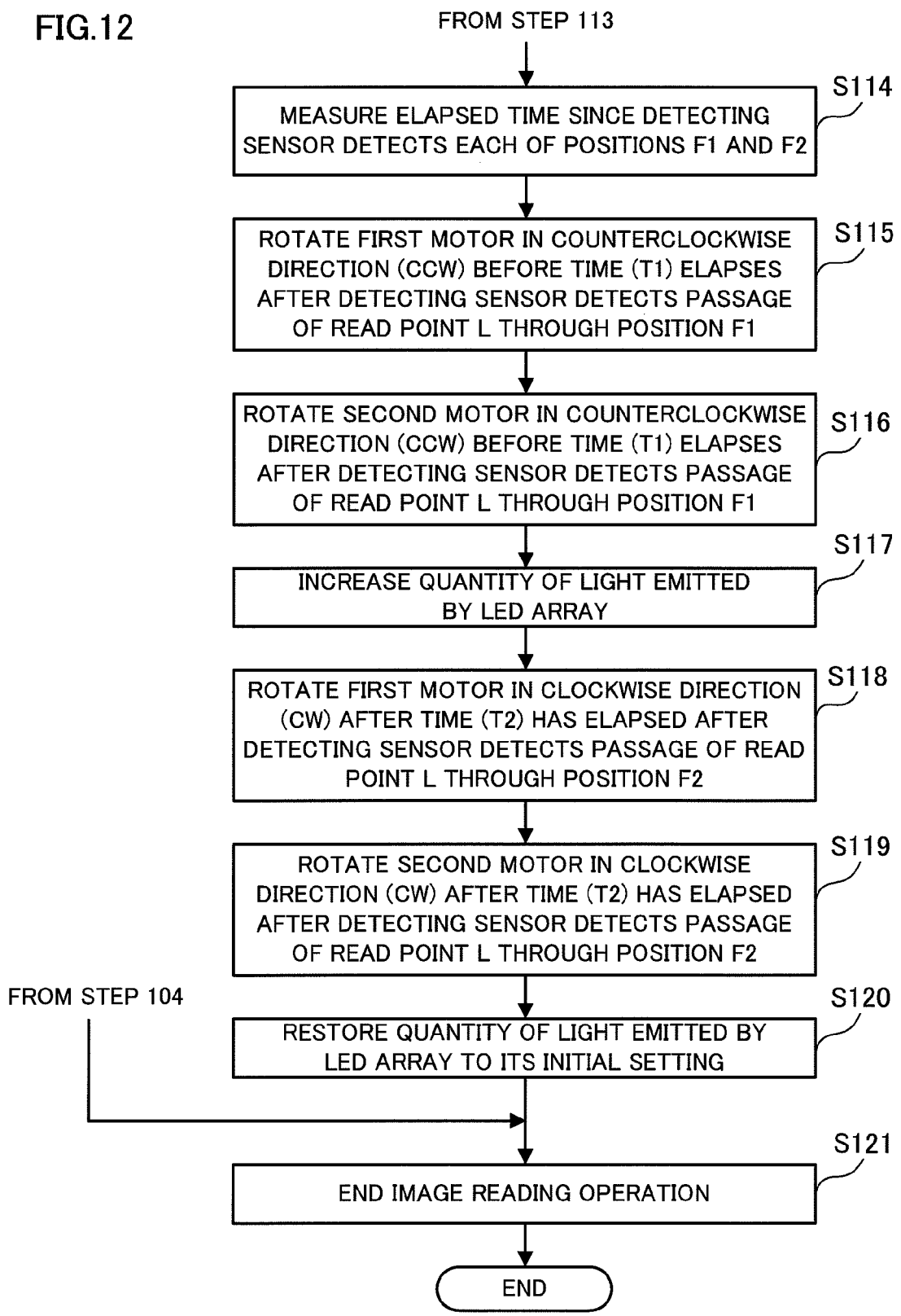

FIGS. 11 and 12 are flowcharts showing an example of a procedure of the process for changing the angular position of the LED array 311c, which is executed by the scanner controller 350. As shown in FIGS. 11 and 12, the central controller 351 of the scanner controller 350 acquires setting information on the original read mode from the controller 30 of the main unit 2 (S101). Then, the central controller 351 determines whether the acquired setting information is the information on the sheet mode to read an original in sheet form or the book mode to read an original in book form (S102).

If the result of the determination in step S102 shows that the sheet mode is set, the central controller 351 does not give a command that the detecting sensor 313 performs detecting operation, to the light source drive controller 356 (S103). Then, the image scanner unit 3 starts an image reading operation (S104). The read color image data is outputted from the signal processor 360 to the image processor 33 of the main unit 2, and the image forming processor 10 of the main unit 2 performs an image forming process. Then, after the completion of scanning throughout the entire original P, the image scanner unit 3 ends the image reading operation (S121).

On the other hand, if the result of the determination in step S102 shows that the book mode is set, the central controller 351 gives the command that the detecting sensor 313 performs the detecting operation, to the light source drive controller 356 (S105). Specifically, the central controller 351 directs the light source drive controller 356 to bring the detecting sensor 313 into operation in order for the detecting sensor 313 to detect the distance between the top surface of the first platen glass 301 and the surface of the book original P. Then, the image scanner unit 3 starts the image reading operation (S106).

After the start of the image reading operation, the light source drive controller 356 acquires a detected value of light quantity from the light receiving sensor 313b (S107). Then, the light source drive controller 356 determines whether or not the distance between the top surface of the first platen glass 301 and the surface of the book original P is equal to or larger than the gap d, on the basis of the acquired detected value of the light quantity (S108). If the distance to the surface of the book original P is smaller than the gap d, the determination process is continued. On the other hand, if the distance to the surface of the book original P is equal to or larger than the gap d, the timing of detection of the position at which the distance is equal to the gap d (e.g., the position F1 in FIG. 7) is stored (S109). Thereby, the light source drive controller 356 calculates the time (T1) between the detection of the gap d by the detecting sensor 313 and the passage of the read point L of the full rate carriage 310 through the position F1, on the basis of the gap D between the detecting sensor 313 and the read point L of the full rate carriage 310, and the scan rate of the full rate carriage 310 (S110).

Subsequently, after a determination is made that the distance to the surface of the book original P is equal to or larger than the gap d in step S108, the light source drive controller 356 determines whether or not the distance between the top surface of the first platen glass 301 and the surface of the book original P is equal to or smaller than the gap d, on the basis of the detected value of the light quantity acquired from the light receiving sensor 313b (S111). If the distance to the surface of the book original P is larger than the gap d, the determination process is continued. On the other hand, if the distance to the surface of the book original P is equal to or smaller than the gap d, the timing of detection of the position at which the distance is equal to the gap d (e.g., the position F2 in FIG. 8) is stored (S112). Thereby, the light source drive controller 356 calculates the time (T2) between the detection of the gap d by the detecting sensor 313 and the passage of the read point L of the full rate carriage 310 through the position F2, on the basis of the gap D between the detecting sensor 313 and the read point L of the full rate carriage 310, and the scan rate of the full rate carriage 310 (S113).

Then, the light source drive controller 356 measures time that has elapsed since the detecting sensor 313 detects each of the positions F1 and F2 (S114). Then, the first motor 315 is rotated at the angle set in advance in the counterclockwise direction (CCW), before the time (T1) elapses after the detection of the passage of the read point L through the position F1 (S115). Thereby, the LED array 311c is tilted from its original position in the counterclockwise direction (CCW).

Also, the light source drive controller 356 rotates the second motor 316 at the angle set in advance in the counterclockwise direction (CCW), before the time (T1) elapses after the detection of the passage of the read point L through the position F1 by the detecting sensor 313 (S116). Thereby, the diffuse-reflector 312c is tilted from its original position in the counterclockwise direction (CCW).

Further, in synchronization with the tilting of the LED array 311c in the counterclockwise direction (CCW), the central controller 351 of the scanner controller 350 gives the command to increase the quantity of light emitted by the LED array 311c, to the light quantity controller 353 that controls the quantity of light emitted by the lighting unit 311 (S117).

Thereafter, the light source drive controller 356 rotates the first motor 315 at the angle set in advance in the clockwise direction (CW), after the time (T2) has elapsed after the detection of the passage of the read point L through the position F2 by the detecting sensor 313 (S118). Thereby, the LED array 311c is restored to its original position.

Also, the light source drive controller 356 rotates the second motor 316 at the angle set in advance in the clockwise direction (CW), after the time (T2) has elapsed after the detection of the passage of the read point L through the position F2 by the detecting sensor 313 (S119). Thereby, the diffuse-reflector 312c is likewise restored to its original position.

Further, in synchronization with the tilting of the LED array 311c in the clockwise direction (CW), the central controller 351 of the scanner controller 350 gives the command to restore the quantity of light emitted by the LED array 311c to its initial setting, to the light quantity controller 353 that controls the quantity of light emitted by the lighting unit 311 (S120).

Then, after the completion of scanning throughout the entire book original P, the image scanner unit 3 ends the image reading operation (S121). Also, the read color image data is outputted from the signal processor 360 to the image processor 33 of the main unit 2, and thereafter, the image forming processor 10 of the main unit 2 also ends the image forming process.

Note that, in the image scanner unit 3 according to the present exemplary embodiment, the diffuse-reflection member 312 is likewise operated to be tilted from its original position in the counterclockwise direction (CCW) as in the case of the LED array 311c, until the read point L finishes passing through the position F2 after passing through the position F1. However, if the tilting of the LED array 311c in the clockwise direction (CW) does not largely reduce for example the influence of light emitted from the LED array 311c leaking to the first mirror 314 through the diffuse-reflector 312c, the diffuse-reflection member 312 may be controlled so as not to operate.

Figure 13:
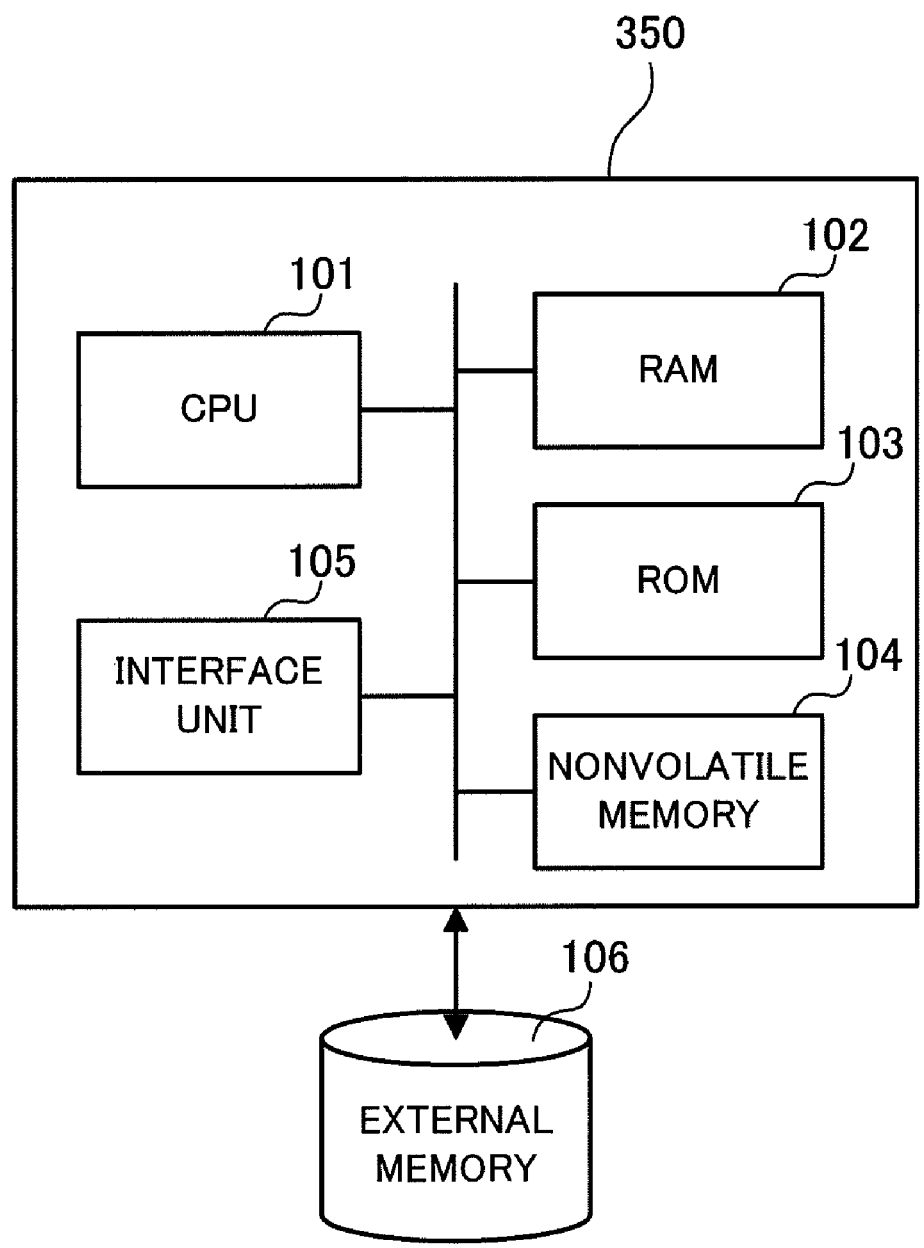
FIG. 13 is a diagram illustrating the hardware configuration of the scanner controller.

FIG. 13 is a diagram illustrating the hardware configuration of the scanner controller 350. As shown in FIG. 13, the scanner controller 350 includes: a CPU 101 as an example of a calculation unit that executes a digital calculation processing according to a program set in advance, at the time of controlling operation of the image scanner unit 3; a RAM 102 in which a program executed by the CPU 101 and the like are stored; a ROM 103 in which data such as a setting value and the like used for the program executed by the CPU 101 or the like is stored; a nonvolatile memory 104 such as EEPROM and a flash memory, which is rewritable, and holds data even without power supply; and an interface unit 105 that controls input and output of signals to and from respective parts connected to the scanner controller 350.

In addition, to the scanner controller 350, an external memory 106 is connected. In the external memory 106, various programs executed by the scanner controller 350 are stored, and, when the scanner controller 350 reads out the processing program, operation control in the image scanner unit 3 of the scanner controller 350 is executed.

In other words, the program or the like executing respective functions of the above-described central controller 351, the CCD controller 352, the light quantity controller 353, the scan controller 354, the original transport mechanism controller 355 and the light source drive controller 356 is loaded into the RAM 102 in the scanner controller 350 from for example a hard disk or a DVD-ROM as the external memory 106. Then, the CPU 101 executes various processings on the basis of the loaded program into the RAM 102. The program may be provided in an alternative manner. For example, the program may be provided so as to be stored in the ROM 103 in advance, and then loaded into the RAM 102. Moreover, when a rewritable ROM 103 such as an EEPROM is provided, only the program is installed in the ROM 103 after the scanner controller 350 is set, and then the program is loaded into the RAM 102. In addition, the program may be transmitted to the scanner controller 350 through a network such as the Internet, be installed in the ROM 103 of the scanner controller 350, and be loaded into the RAM 102.

In the image scanner unit 3 according to the present exemplary embodiment, as described above, the LED array 311c formed of the array of the multiple high-intensity white LEDs is used as the light source that lights the original P, and the LED array 311c is arranged at such an angle that the optical axis S of the LED array 311c (the high-intensity white LEDs) does not coincide with the read point L of the original P. Accordingly, the configuration is such that light from the high-intensity white LEDs does not converge on the read point L but is diffused for irradiation to make the light quantity density at the read point L appropriate.

Also, to read the folded book original P, the folded portion Q of the book original P irradiated directly with light emitted from the optical axis S of the LED array 311c is configured so that at least the angular position of the LED array 311c is changed at the time of passage of the read point L of the full rate carriage 310. This provides the appropriate light quantity density at the read point L in the situation where the folded portion Q coincides with the read point L, thus suppressing the occurrence of defective image reading such as the spotting phenomenon.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
   an original placing unit on which an original is to be placed, and the original placing unit transmitting light applied onto an original surface of the original and light reflected by the original surface;
   a lighting unit that has a plurality of light-emitting elements arrayed in a line and that lights the original surface of the original placed on the original placing unit;
   an image signal generating unit that receives the light reflected by the original surface lit by the lighting unit and that generates an image signal;
   a detecting unit that detects a position of the original surface and detects a distance between the original surface and a reference plane set in advance; and
   a lighting-unit setting unit that sets, by using a result of the detection by the detecting unit, the lighting unit at an angular position so that the image signal generating unit does not receive light emitted from an optical axis of the light-emitting elements and then reflected by the original surface, and the lighting-unit setting unit changes the setting of the angular position of the lighting unit according to the distance detected by the detecting unit.

2. The image reading apparatus according to claim 1, wherein
   the detecting unit is disposed at a front side of the lighting unit in a movement direction of the lighting unit, and
   if the detecting unit detects the distance equal to a distance between the reference plane and a position of the original surface satisfying a condition that the image signal generating unit receives the light emitted from the optical axis of the light-emitting elements and then reflected by the original surface, the lighting-unit setting unit changes the setting of the angular position of the lighting unit after the detection of the distance equal to the distance satisfying the condition by the detecting unit.

3. The image reading apparatus according to claim 1, wherein
   the detecting unit is disposed at a front side of the lighting unit in a movement direction of the lighting unit, and
   after change of the setting of the angular position of the lighting unit, if the detecting unit detects the distance equal to a distance between the reference plane and a position of the original surface satisfying a condition that the image signal generating unit receives the light emitted from the optical axis of the light-emitting elements and then reflected by the original surface, the lighting-unit setting unit restores the setting of the angular position of the lighting unit to a pre-change angular position after the detection of the distance equal to the distance satisfying the condition by the detecting unit.

4. The image reading apparatus according to claim 1, further comprising:
   a diffuse-reflection unit that diffuses and reflects, toward the original surface, light emitted from the lighting unit; and
   a diffuse-reflection unit setting unit that changes setting of an angular position of the diffuse-reflection unit, when the lighting-unit setting unit changes setting of the angular position of the lighting unit.

5. The image reading apparatus according to claim 1, wherein, in the lighting unit, a quantity of light emitted by each of the light-emitting elements is increased when the lighting-unit setting unit changes setting of the angular position of the lighting unit.

6. A controller comprising:
   an angular position controller that controls setting of an angular position of a lighting unit that has a plurality of light-emitting elements arrayed in a line and that lights an original surface of an original to be read; and
   a detecting unit that detects a position of the original surface, the detecting unit is disposed at a front side of the lighting unit in a movement direction of the lighting unit, and detects a distance between a reference plane set in advance and the original surface of the original placed on an original placing unit on which the original is to be placed,
   the angular position controller sets, by using a result of the detection by the detecting unit, the lighting unit at the angular position so that an image signal generating unit does not receive light emitted from an optical axis of the light-emitting elements and then reflected by the original surface, the image signal generating unit receiving light reflected by the original surface and generating an image signal, and
   if the detecting unit detects the distance equal to a distance between the reference plane and a position of the original surface satisfying a condition that the image signal generating unit receives the light emitted from the optical axis of the light-emitting elements and then reflected by the original surface, the angular position controller changes the setting of the angular position of the lighting unit after the detection of the distance equal to the distance satisfying the condition by the detecting unit.

7. The controller according to claim 6, wherein
the detecting unit is disposed at a front side of the lighting unit in a movement direction of the lighting unit, and detects a distance between a reference plane set in advance and the original surface of the original placed on an original placing unit on which the original is to be placed, and,
after change of the setting of the angular position of the lighting unit, if the detecting unit detects the distance equal to a distance between the reference plane and a position of the original surface satisfying a condition that the image signal generating unit receives the light emitted from the optical axis of the light-emitting elements and then reflected by the original surface, the angular position controller restores the setting of the angular position of the lighting unit to a pre-change angular position after the detection of the distance equal to the distance satisfying the condition by the detecting unit.

8. The controller according to claim 6, further comprising a diffuse-reflection unit controller that performs control so as to change an angular position of a diffuse-reflection unit that diffuses and reflects, toward the original surface, light emitted from the lighting unit, when the angular position controller changes the setting of the angular position of the lighting unit.

9. The controller according to claim 6, further comprising a light quantity controller that performs control so as to increase quantity of light emitted by each of the light-emitting elements that constitute the lighting unit, when the angular position controller changes the angular position of the lighting unit.

10. An image forming apparatus comprising:
an image reading unit that reads an image from an original, and generates image data; and
an image forming unit that forms an image on the basis of the image data generated by the image reading unit;
the image reading unit comprising:
an original placing unit on which the original is to be placed, and the original placing unit transmitting light applied onto an original surface of the original and light reflected by the original surface;
a lighting unit that has a plurality of light-emitting elements arrayed in a line and that lights the original surface of the original placed on the original placing unit;
an image signal generating unit that receives the light reflected by the original surface lit by the lighting unit and that generates an image signal;
a detecting unit that detects a position of the original surface and detects a distance between the original surface of the original placed on the original placing unit and a reference plane set in advance; and
a lighting-unit setting unit that sets, by using a result of the detection by the detecting unit, the lighting unit at an angular position so that the image signal generating unit does not receive light emitted from an optical axis of the light-emitting elements and then reflected by the original surface, and the lighting-unit setting unit changes setting of the angular position of the lighting unit according to the distance detected by the detecting unit.

11. An angular position controlling method for controlling setting of an angular position of a lighting unit that has a plurality of light-emitting elements arrayed in a line and that lights an original surface of an original to be read, the angular position controlling method comprising:
detecting a position of the original surface and detecting a distance between the original surface of the original placed and a reference plane set in advance; and
setting, by using a result of the detection, the lighting unit at the angular position so that an image signal generating unit does not receive light emitted from an optical axis of the light-emitting elements and then reflected by the original surface, the image signal generating unit receiving light reflected by the original surface and generating an image signal, and changing the setting of the angular position of the lighting unit according to the detected distance.

* * * * *